US009309887B2

(12) United States Patent
Maass

(10) Patent No.: US 9,309,887 B2
(45) Date of Patent: Apr. 12, 2016

(54) SYSTEM AND METHOD OF REMOTELY CONNECTING AND DISCONNECTING THE AUXILIARY POWER SUPPLY OF A FREQUENCY INVERTER FOR VARIABLE CAPACITY COMPRESSOR EMPLOYED IN COOLING SYSTEMS

(75) Inventor: Gunter Johann Maass, Joinville (BR)

(73) Assignee: Whirlpool S.A., Sao Paulo (BR)

( * ) Notice: Subject to any disclaimer, the term of this patent is extended or adjusted under 35 U.S.C. 154(b) by 371 days.

(21) Appl. No.: 14/001,357

(22) PCT Filed: Feb. 25, 2012

(86) PCT No.: PCT/BR2012/000036
§ 371 (c)(1),
(2), (4) Date: Jan. 3, 2014

(87) PCT Pub. No.: WO2012/113047
PCT Pub. Date: Aug. 30, 2012

(65) Prior Publication Data
US 2014/0105757 A1    Apr. 17, 2014

(30) Foreign Application Priority Data

Feb. 25, 2011    (BR) ..................................... 1100270

(51) Int. Cl.
*H02K 7/14* (2006.01)
*F04C 28/00* (2006.01)
(Continued)

(52) U.S. Cl.
CPC ................. *F04C 28/00* (2013.01); *H02M 3/00* (2013.01); *F04C 28/08* (2013.01);
(Continued)

(58) Field of Classification Search
CPC ........................................................ F04C 28/00
USPC ........................................................ 318/3, 34
See application file for complete search history.

(56) References Cited

U.S. PATENT DOCUMENTS

| 8,109,103 B2 * | 2/2012 | Natsume ............... F24F 11/006 |
| | | 318/766 |
| 2001/0010639 A1 | 8/2001 | Shirato et al. |
| 2007/0124615 A1 | 5/2007 | Orr |

FOREIGN PATENT DOCUMENTS

| EP | 1 122 872 B1 | 5/2007 |
| JP | 2000 333365 | 11/2000 |

OTHER PUBLICATIONS

International Search Report mailed Mar. 14, 2013 for International Application No. PCT/BR2012/000036.
(Continued)

*Primary Examiner* — David S Luo
(74) *Attorney, Agent, or Firm* — Fay Sharpe LLP

(57) ABSTRACT

System and method of remotely connecting and disconnecting an auxiliary power supply of the frequency inverter for variable capacity compressors employed in cooling systems. The inverter includes a circuit breaker that when it receives an external signal to activate the auxiliary power supply indicating that the auxiliary supply should be connected, the circuit breaker enables the auxiliary power supply, which activates the inverter. The inverter begins sending, continually, the internal maintenance signal to activate the auxiliary supply to the circuit breaker indicating that the auxiliary supply should be kept running, making the circuit breaker maintain the auxiliary power supply enabled. When the circuit breaker receives an external deactivation signal from the auxiliary supply indicating that the auxiliary supply should be disconnected, the inverter stops sending the signal to maintain the auxiliary supply activated to the circuit breaker, and the circuit breaker disables the auxiliary power supply, deactivating the inverter.

20 Claims, 11 Drawing Sheets

(51) Int. Cl.
  *H02M 3/00* (2006.01)
  *F04C 28/08* (2006.01)
  *H02M 1/00* (2007.01)
(52) U.S. Cl.
  CPC .... *F04C 2240/403* (2013.01); *F04C 2240/808* (2013.01); *F04C 2270/02* (2013.01); *F04C 2270/095* (2013.01); *F04C 2270/105* (2013.01); *H02M 2001/0032* (2013.01)

(56) References Cited

OTHER PUBLICATIONS

Written Opinion mailed Mar. 14, 2013 for International Application No. PCT/BR2012/000036.
International Preliminary Report on Patentability mailed Oct. 2, 2013 for International Application No. PCT/BR2012/000036.

* cited by examiner

FIG. 2a
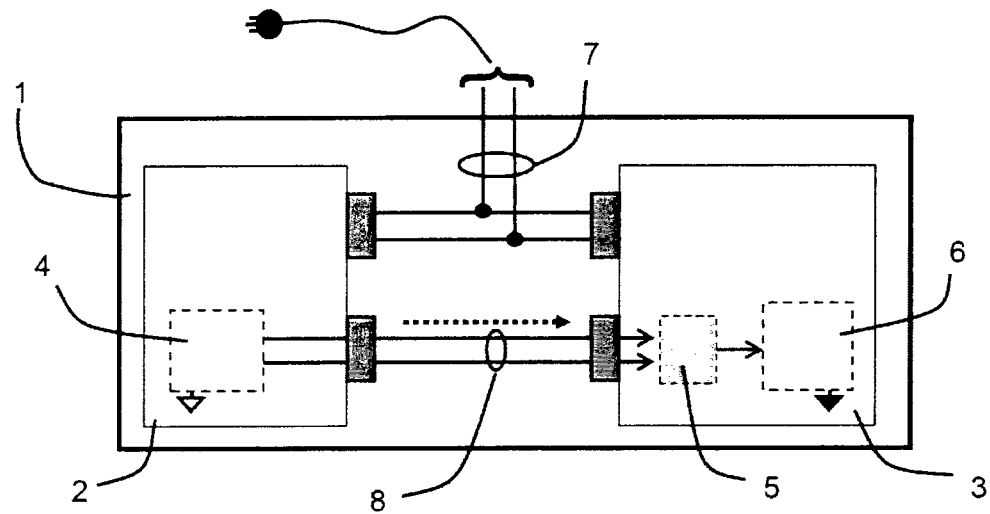
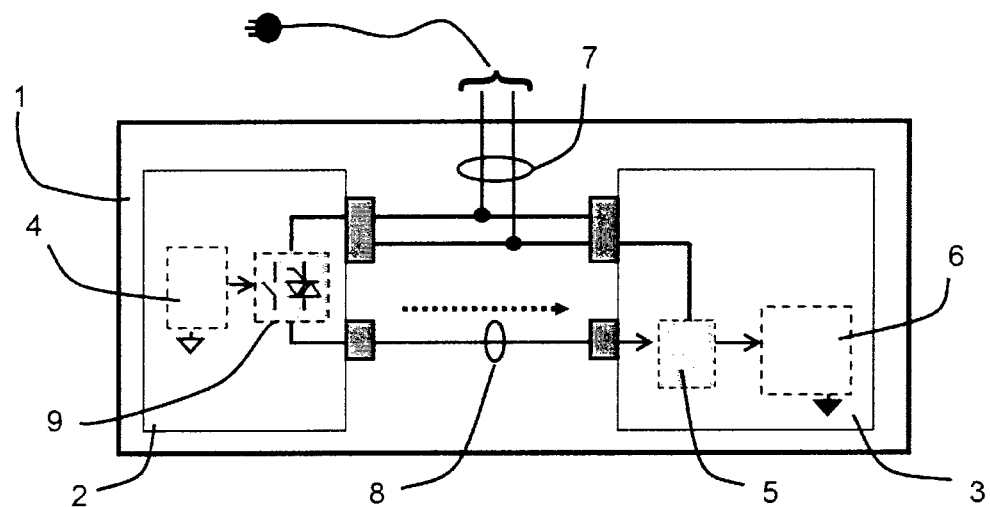
FIG. 2b

SYSTEM AND METHOD OF REMOTELY CONNECTING AND DISCONNECTING THE AUXILIARY POWER SUPPLY OF A FREQUENCY INVERTER FOR VARIABLE CAPACITY COMPRESSOR EMPLOYED IN COOLING SYSTEMS

The present invention refers to an electronic control system and method of a compressor, which remotely connects and disconnects the auxiliary power supply used in frequency inverters employed to drive variable capacity compressors in cooling systems, with the purpose of reducing the consumption of electric energy during compressor downtime, and consequently enhancing the efficiency of the cooling system.

BACKGROUND OF THE INVENTION

In order to meet the most demanding requirements of energy efficiency and cooling, domestic and commercial cooling systems have the option of using variable capacity compressors, which allow the adjustment of the cooling capacity by varying the speed of pumping the coolant gas (that is, the mass flow), in accordance with the system's need and its demand for cooling.

Said variable capacity compressor performs the excursion of a minimum value of mass flow to a maximum value by varying the rotation of its motor. Rotation variation is obtained by means of an electronic control called frequency inverter, which adjusts the voltage and the frequency applied to the motor.

Said frequency inverter is composed of various electronic circuits having distinct functions, such as, for example, a power circuit that has an input stage for electromagnetic interference filtering and a stage called "bridge rectifier" for converting the alternating current of the power grid to continuous voltage, a control circuit (microcontroller or DSP—Digital Signal Processor), an auxiliary power supply for generating internal voltages for the other circuits or components of the inverter, a circuit formed by power semiconductors to drive the electric motor employed in the compressor, among others.

Figure 1:
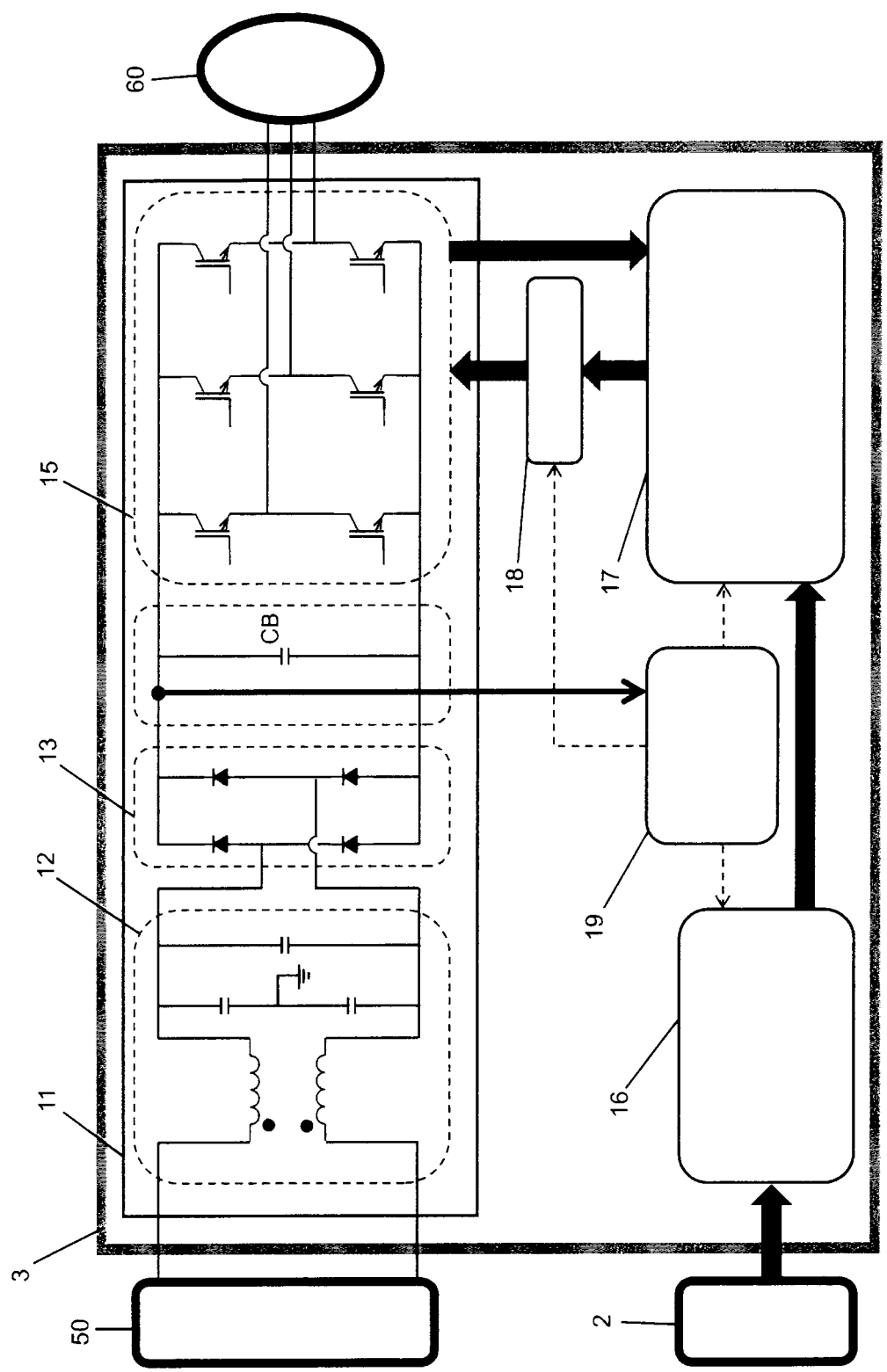

FIG. 1 shows, in simplified form, the main components of a frequency inverter according to the state of the art, applied to variable capacity compressors 60. Connected to the frequency inverter are an alternating current power grid 50 and a thermostat of the cooler at its inputs, and the compressor at its output, whose running it controls. The main components of the power circuit 11 of the inverter are the electromagnetic interference filter, a diode bridge rectifier, the CB bus capacitor and the three-phase inverter bridge. The voltage on the CB capacitor is the result of rectification of the input alternating current, forming the CC bus of the inverter, to which there is connected an auxiliary voltage supply. This supply is responsible for providing the feed voltage to the other components of the inverter, such as command, communication and control circuits of the frequency inverter, converting the continuous high voltage, generated on the CC bus of the power circuit, into continuous low amplitude voltage, suitable for feeding these components. Once these subcircuits are powered up, they work as usual, and the command signal is received from the thermostat, which is interpreted by the control circuit which drives the inverter bridge and monitors the electrical magnitudes of the compressor in order to control it. It can be seen in FIG. 1 that the auxiliary power supply is permanently connected to the CC bus, consuming energy, regardless of the status of the compressor (on or off).

The auxiliary power supply may employ high frequency energy conversion methods, commonly called "SMPS"—Switched Mode Power Supply, or low frequency methods, such as linear supplies and capacitive supplies. Regardless of the topology of the auxiliary power supply, in the state of the art it is continuously connected to the CC bus, whether or not the compressor is running. Unless the inverter is disconnected from the alternating current of the power grid, this supply will be continually consuming energy, of a few Wh (Watt-hour) or hundreds of mWh (milli-Watt-hour). The consumption of energy during compressor downtime is called "Stand-By Consumption" and its function can basically be resumed in maintaining the control circuit of frequency inverter prepared to drive the compressor again in a new cooling cycle of the cooling system.

The stand-by consumption, though small compared to the consumption of energy while the compressor is operating, is considered undesirable since it represents a waste of energy for a time interval in which the cooling system compressor is not performing its main function of removing heat from the cooling system by movement and compression of coolant gas. The stand-by consumption of the frequency inverter is, therefore, a source of energy losses in a cooling system, as it is an absolutely dispensable waste.

With the objective of increasing the efficiency of cooling systems, in the state of the art, the frequency inverter is disconnected from the power grid whenever the compressor is inactive, disconnecting the auxiliary power supply and eliminating the stand-by consumption. This method employs switches, such as relays or electro-mechanical thermostats, or semiconductors. In both cases, the switches are dimensioned to be able to withstand the input electric current of the frequency inverter, of high amplitude when the compressor is in operation. In the case of using relays, there is also the drawback of having consumption by this relay during the interval in which the compressor is active, whereby minimizing the gain obtained by disconnecting the inverter from the power grid and consequent elimination of the stand-by consumption. Further, disconnection by relay, when performed by another electronic control present in the cooling system (control referred to as "electronic thermostat"), requires that this second control have an oversized the electronic circuit, such as, for example, the presence of a digital output to drive the relay, the relay itself, and a power supply capable of driving this relay during the interval in which the compressor is in operation. In contrast, the use of semiconductors, such as TRIACs, to interrupt the feed of the frequency inverter, also has the drawbacks of conduction losses and the need to oversize this semiconductor to withstand the initial charge current from the CB bus capacitor of the inverter (in-rush current).

Figure 2C:
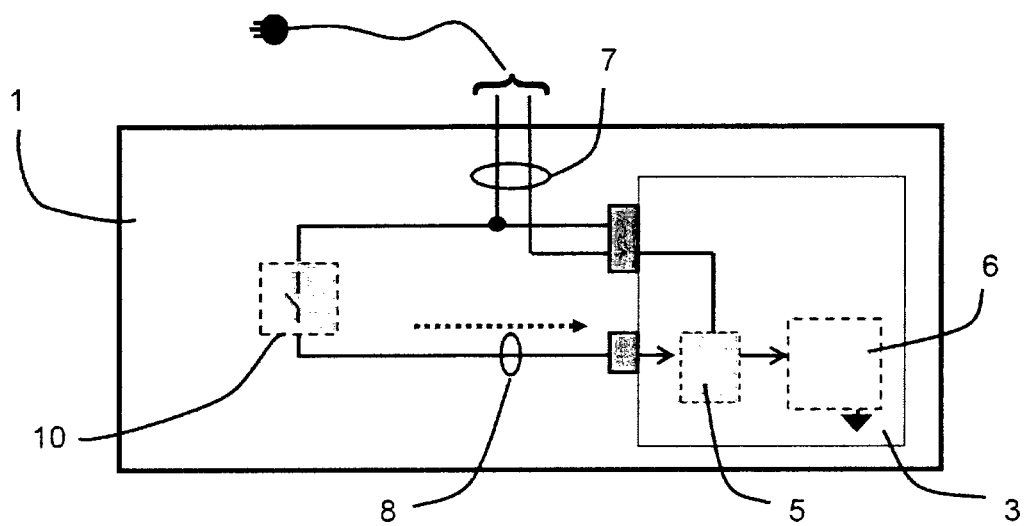

FIGS. 2a, 2b and 2c represent arrangements of the inverter according to the state of the art. As will be noted in the descriptions ahead, in none of the cases is the command signal, or the physical interface means (cables) between the inverter and an external thermostat, used to disconnect the auxiliary supply of the inverter.

FIG. 2a represents a cooling system arrangement 1, wherein an electronic thermostat 2 has a control circuit 4 responsible for defining the operating status of the compressor. The electronic thermostat sends command signals to the frequency inverter 3 through the cables 8. The inverter has a circuit 5 responsible for receiving the signal from the thermostat and adjusting it to interpret the control circuit 6, which controls the operation of the compressor, which can be called communication unit. In this arrangement, the command signal of the thermostat may assume different formats, according to the communication protocol of each manufacturer of cooling systems. For example, it is possible to send a frequency signal proportional to the rotation which is desirable for the compressor, a certain frequency value or the absence of a signal (zero) to keep the compressor disconnected, among others. It is noted that this cooling system has a cable 8 for communication between the thermostat and the communication circuit 5. This connection is used by the thermostat to send operation control signals of the compressor, for example, references for frequency and amplitude from the feed signal of the compressor. Although the figure shows two links between the thermostat and the communication circuit, one is the reference (zero) and the other is the signal itself, to the extent that there is only one cable.

FIG. 2b shows another arrangement of the compressor control system according to the state of the art, in which the control circuit 4 of the electronic thermostat 2 drives a switch 9 to send to the input circuit 5 of the frequency inverter a voltage signal referenced to the power grid. In other words, the control circuit 6 of the frequency inverter 3 receives pulses with the same frequency of the power grid. The thermostat sends to the communication input circuit 5 both a signal to command the connection/disconnection of the compressor, and command signals obtained by modulating the switch 9, though the latter are less usual. The switch 9 may be both an electro-mechanical relay contact and a semiconductor referenced to the power grid, and usually it is maintained open when it is desirable for the compressor to be disconnected.

FIG. 2c shows a simpler arrangement of the compressor control system according to the state of the art. Here, the thermostat 10 is not electronic, but of the electro-mechanical kind. The thermostat has a contact that is closed when the temperature of the cooling system rises above the reference value. In this arrangement, the contact of the electro-mechanical thermostat is open whenever it is desirable to keep the compressor disconnected. Both in this arrangement, as in that of FIG. 2b, the rotation of the motor inside the compressor is adjusted by the frequency inverter and not by the thermostat. The only command from the thermostat is to connect or disconnect the compressor. In FIG. 2a and potentially in FIG. 2b, the thermostat sends to the inverter both a signal to connect or disconnect the compressor, and also command signals to control the frequency and/or a feed voltage of the compressor.

In all the arrangements described in the state of the art, the frequency inverter is permanently connected to the alternating current power grid through the cable 7. Therefore, even if the compressor is disconnected, the CB capacitor of the CC bus, shown in FIG. 1, is charged with the rectified voltage from the power grid and the auxiliary power supply of the inverter will be consuming a quantity of energy to keep the control, communication and command circuits of the inverter running, prepared to reconnect the compressor in a subsequent command to connect the thermostat.

Figure 3:
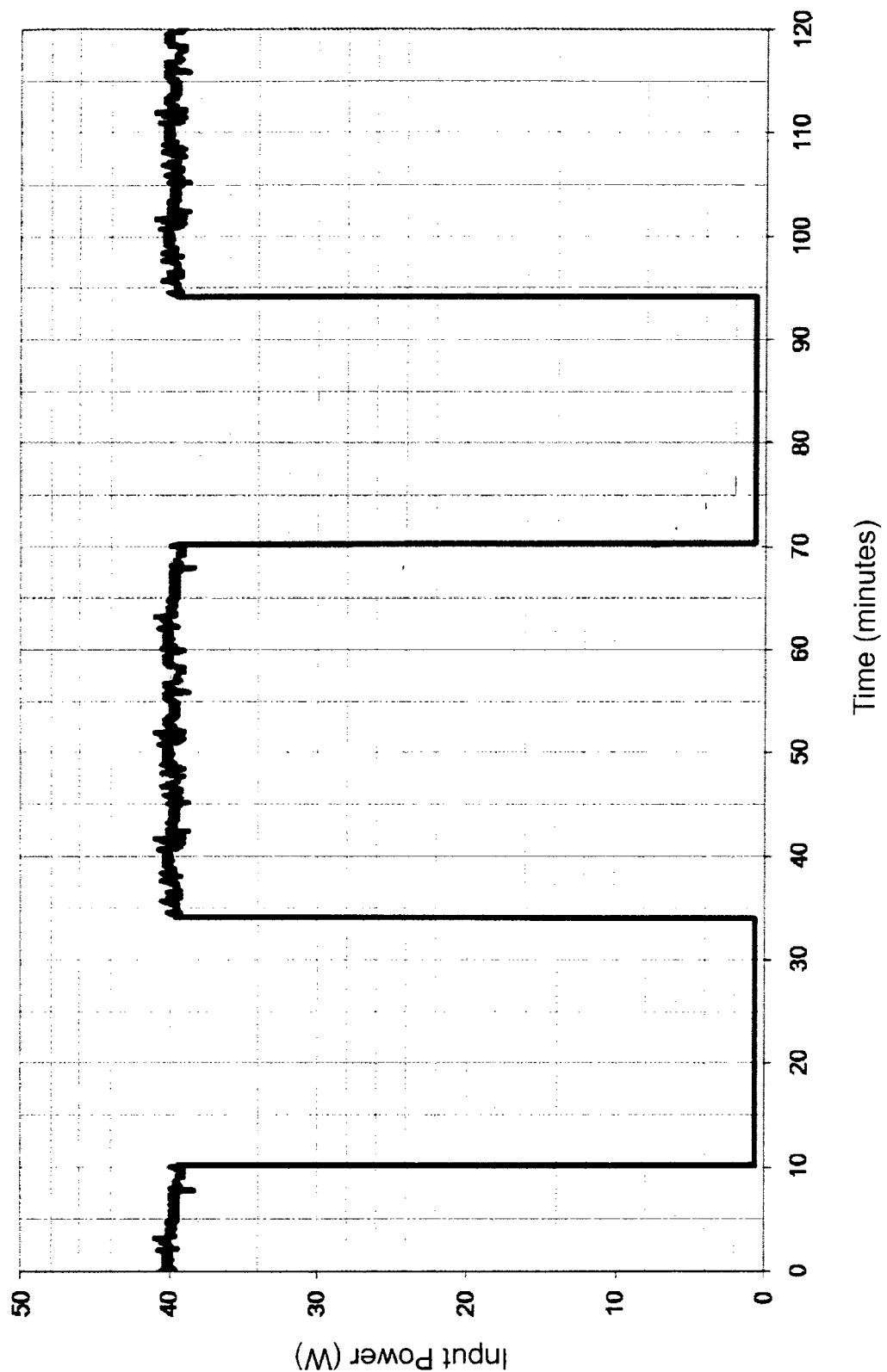

FIG. 3 is a graph that shows the input power of the frequency inverter using control systems also from the state of the art. In this graph, two power levels can be seen, one about 40 W which occurs when the compressor is connected, and another about 0.7 W during stand-by, that is, in the intervals in which the compressor is disconnected. In order to reduce energy consumption and increase the efficiency of the cooling system, it is desirable to reduce drastically this value of 0.7 W. In the systems of the state of the art with a consumption behavior such as that illustrated in FIG. 3, the average available power is 24 Wh (40 W at peak, with working cycles of 60%—cycle of 60 minutes, in which the compressor remains connected for 36 minutes). If the stand-by consumption were reduced to 0.1 W, there would be a gain of 0.24 Wh in average consumption, representing an improvement of 1% in the efficiency of the system.

Figure 4:
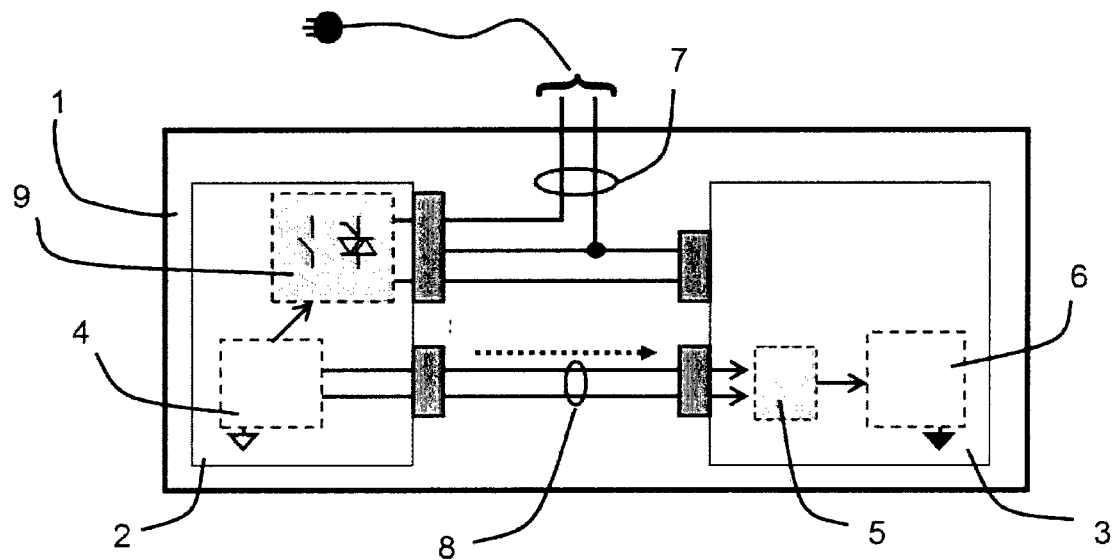

FIG. 4 illustrates a circuit of the state of the art which attempts to eliminate the stand-by consumption of the inverter, using an arrangement in which the frequency inverter 3 is not permanently connected to the alternating current power grid. Here, the phase or the neutral of the power grid is disconnected from the inverter by way of the switch 9 present in the thermostat 2. This switch may be a contact of an electro-mechanical relay or a semiconductor of the TRIAC kind, and it is commanded to open the feed of the inverter whenever it is necessary to disconnect the compressor. When the compressor motor has to be connected, the inverter is again connected to the power grid by closing the circuit by way of the switch. Then, the command for defining the rotation of the motor inside the compressor is sent from the thermostat 2 to the inverter through the cable 8, which is a separate connection from the one that connects and disconnects the inverter. There are also other arrangements similar to the one illustrated in FIG. 2c, in which the thermostat sends commands only to connect or disconnect the inverter, while it controls the rotation of the motor. However, in the latter cases, there must be a non-volatile memory in the inverter, so that it memorizes the prior operating status of the compressor in order to define a rotation status soon after powering up the inverter.

The solutions of the state of the art to eliminate the stand-by consumption provide an unsatisfactory efficiency gain, and need to use more expensive components. In cases where the feed of the inverter is interrupted by an electro-mechanical relay contact, there will be consumption by the bobbin of the relay in the intervals in which the compressor is connected. Thus, considering the conventional consumption of a relay at 260 mW, the gain for a cooling system with operating behavior similar to that of FIG. 3, will be 0.124 Wh, or 0.52%. More significant than this difference is the cost for the solution with relay, because besides the thermostat itself, it will have to have a voltage supply with this additional capacity of 260 mW. On the other hand, in a case where the feed of the inverter is removed by a TRIAC semiconductor, there will be losses by conduction in this component in the intervals in which the compressor is operating. Considering that the RMS input current of the inverter is 0.3 A (40 W, 230 V, power factor of 0.58), the loss by conduction of a TRIAC will be about 360 mW, that is, the gain for a cooling system with an operating behavior similar to that of FIG. 3 will be less than 0.10 Wh, or less than 0.4%. And just as in the case of the relay, there will also be the cost of a TRIAC, of its command circuit, and of a potential form of heat dissipation, since the conduction losses may overheat the TRIAC when the compressor demands greater powers and currents from the power grid.

OBJECTIVES OF THE INVENTION

The objective of the present invention is to provide a system and an electronic control method of a variable capacity compressor which drastically reduce the energy consumption of the inverter during stand-by when the compressor is down. Therefore, there is a rise in the efficiency of the cooling system with variable capacity compressors, enabling the achievement of the higher levels of efficiency demanded by the market.

It is also an objective of the invention to provide an electronic control system of a variable capacity compressor that uses low capacity components to conduct the electric current, reducing implementation costs.

Another objective of the invention is to provide an electronic control system of a variable capacity compressor capable of disconnecting and reconnecting the auxiliary power supply of the frequency inverter by way of the same physical means currently employed to transmit to the frequency inverter a control signal of the compressor motor, without the need to alter the hardware of the current thermostat solutions.

BRIEF DESCRIPTION OF THE INVENTION

The objectives of the invention are achieved by means of an electronic control system of a variable capacity compressor, comprising an inverter that receives external control signals, and generates signals to drive the compressor, and the inverter has:
a power circuit for adjusting the feed voltage of the compressor, with a feed input for alternating current, a continuous voltage bus and a variable frequency and amplitude voltage output for feeding the compressor,
at least one internal processing circuit, and
an auxiliary power supply that provides voltage to the internal circuits of the inverter, assuring feasibility of the running thereof,
the inverter also comprises a circuit breaker with a first input that receives from an internal processing circuit of the inverter an external signal to activate the auxiliary power supply, a second input that receives from an internal processing circuit inverter a maintenance signal to activate the auxiliary power supply and an output connected to an input of the auxiliary power supply,
and when the external activation signal indicates that the auxiliary power supply should be disconnected, the circuit breaker enables the running of the auxiliary power supply, which activates the running of the inverter, and the internal processing circuit of the inverter begins sending, continually, the internal maintenance signal to activate the auxiliary power supply to the circuit breaker, indicating that the auxiliary supply and, when necessary, also the compressor should be kept running, and making the circuit breaker keep the auxiliary power supply enabled,
when the external signal to activate the auxiliary supply indicates that the auxiliary supply should be disconnected, and the internal processing circuit of the inverter stops sending the maintenance signal to activate the auxiliary power supply to the circuit breaker, the circuit breaker disables the auxiliary power supply, deactivating the running of the inverter and when applicable, the compressor as well.
The input of the auxiliary power supply connected to the output of the circuit breaker can be an enable input, and the auxiliary power supply also has a feed input connected to the continuous voltage bus of the power circuit, and when the signal to activate the auxiliary supply indicates that the compressor should be connected, the circuit breaker sends an activation signal to the enable input of the auxiliary power supply that activates the auxiliary power supply.
Alternatively, the input of the auxiliary power supply connected to the output of the circuit breaker can be a feed input, and then the circuit breaker also comprises a third input connected to the continuous voltage bus of the power circuit, and when the signal to activate the auxiliary supply indicates that that of the auxiliary supply should be connected, the circuit breaker establishes an electrical connection between the feed input of the auxiliary power supply and the continuous voltage bus of the power circuit, feeding and activating the auxiliary power supply, the electrical connection between the auxiliary power supply and the continuous voltage bus is maintained while the circuit breaker receives the signal to maintain the auxiliary supply activated.

Preferably, the inverter also comprises, as internal processing circuits, a communication unit and a control block, wherein:
the communication unit has an input that receives the external control signals to connect or disconnect the auxiliary supply, an output connected to the control block for sending the operation control signals of the compressor, an output connected to the first input of the circuit breaker, for sending the signal to activate the auxiliary supply, and an additional feed connection with the power circuit that feeds and keeps the communication unit activated, when the auxiliary power supply is disconnected,
the control block has an input for receiving the control signals of the compressor sent by the communication unit, and interpreting them, an output for sending to the power circuit a command signal to adjust the feed voltage of the compressor, and an output for sending to the circuit breaker of the signal to maintain the auxiliary supply activated, during the period in which the supply should remain connected.
The input of the communication unit that receives the external control signals to connect or disconnect the power supply is preferably connected to a thermostat that sends these control signals to connect and disconnect the compressor. The thermostat may also send to the communication unit operation control signals of the compressor by the same means of connection used to send the control signals to connect and disconnect the auxiliary supply and the compressor, and the communication unit can send to the control block the operation control signals of the compressor suitable for interpretation, and when the control block sends to the circuit breaker the maintenance signal indicating that the supply should be kept connected, the thermostat may send to the communication unit only operation control signals of the compressor.

The control block preferably comprises a control circuit and a command circuit, and the control circuit receives the signals from the communication unit, sends the maintenance signal to the circuit breaker, sends the control signal to the command circuit, receives electrical magnitudes from the compressor and monitors its running, and the command circuit sends a command signal to the power circuit, the control circuit and the command circuit also both receive a feed voltage from the auxiliary power supply.

The power circuit preferably comprises an electromagnetic interference filter connected to the alternating current input, a wave rectifier connected to the filter output, a bus capacitor connected in parallel with the rectifier and an inverter bridge connected in parallel to the bus capacitor and at the voltage output of the power circuit, and the circuit breaker may be connected at any point of the continuous voltage bus of the power circuit.

The thermostat may alternatively send to the communication unit only external control signals to connect or disconnect the compressor and not send operation control signals of the compressor. In this case, the control block will control the operation of the compressor preferably based on past operating records. Therefore, the system according to the invention may comprise a non-volatile memory that stores the past operating records of the compressor.

The objectives of the invention are also achieved by way of an electronic control method of a variable capacity compressor, by means of a system that comprises an inverter that controls the operation of the compressor, the inverter having a power circuit for adjusting the feed voltage of the compressor, at least one internal processing circuit, an auxiliary power supply powered by the power circuit, that sends internal feed signals of the inverter and activates its running, and the circuit breaker to activate the auxiliary power supply, wherein the method comprises the following steps:

send to the circuit inverter an external command signal to connect the auxiliary supply and, if necessary, the compressor;

in response to the external command signal, an internal processing circuit of the inverter sends to the circuit breaker an external signal to activate the auxiliary supply indicating that the auxiliary supply should be connected, the circuit breaker enables the running of the auxiliary power supply, the auxiliary power supply provides feed voltage to the components of the inverter, activating its running, the inverter begins sending a signal to maintain the auxiliary supply to the circuit breaker activated, during the period in which the auxiliary supply should remain connected, and, if necessary, control signals to the compressor to control its operation;

when the auxiliary supply has to be disconnected, send to the inverter an external command signal to disconnect the auxiliary supply and the compressor, if it is connected;

the circuit inverter disconnects the compressor, if it is connected, and sends to the circuit breaker a deactivation signal indicating that the auxiliary supply should be disconnected and the circuit inverter stops sending the signal to maintain the auxiliary supply to the circuit breaker activated, the circuit breaker disables the running of the auxiliary power supply, deactivating the running of the inverter.

The auxiliary power supply may have an enable input connected to the output of the circuit breaker, and a feed output connected to the continuous voltage bus of the power circuit, and in the step in which the circuit breaker enables the running of the auxiliary power supply, the circuit breaker sends an activation signal to an enable input of the auxiliary power supply which activates the auxiliary power supply.

Alternatively, the auxiliary power supply has a feed input connected to the output of the circuit breaker, and the circuit breaker comprises an input connected to the continuous voltage bus of the power circuit, and in the step in which the circuit breaker enables the running of the auxiliary power supply, the circuit breaker establishes an electrical connection between the feed input of the auxiliary power supply and the continuous voltage bus of the power circuit, feeding and activating the auxiliary power supply, the electrical connection between the auxiliary power supply and the continuous voltage bus is kept while the circuit breaker receives the maintenance signal to activate the auxiliary supply.

Preferably, an external thermostat of the inverter sends to the inverter the command signal to connect and disconnect the inverter, and more preferably, the thermostat also sends to the circuit inverter operation control signals of the compressor.

The circuit inverter may comprise, as internal processing circuits, a communication unit and a control block, wherein:

the communication unit performs the steps of receiving the external command signal to connect or disconnect the power supply, adjusting these signals for interpreting the control block, and sending to the circuit breaker the signal to activate the auxiliary supply indicating that the auxiliary supply should be connected, the control block performs the steps of receiving and interpreting the control signals of the compressor sent by the communication unit, sending to the power circuit a command signal to adjust the feed voltage of the compressor, sending to the circuit breaker the signal to maintain the auxiliary supply activated during the period in which the auxiliary supply should remain connected, receiving electrical magnitudes of the compressor and monitoring its running.

Preferably, while the control block sends to the circuit breaker the signal to maintain the auxiliary supply activated, the thermostat sends to the communication unit only operation control signals of the compressor.

Alternatively, the thermostat sends the communication unit only external control signals to connect or disconnect the compressor, and then there is performed a step of storing the past operating records of the compressor in a non-volatile memory.

SUMMARIZED DESCRIPTION OF THE DRAWINGS

Figure 5:
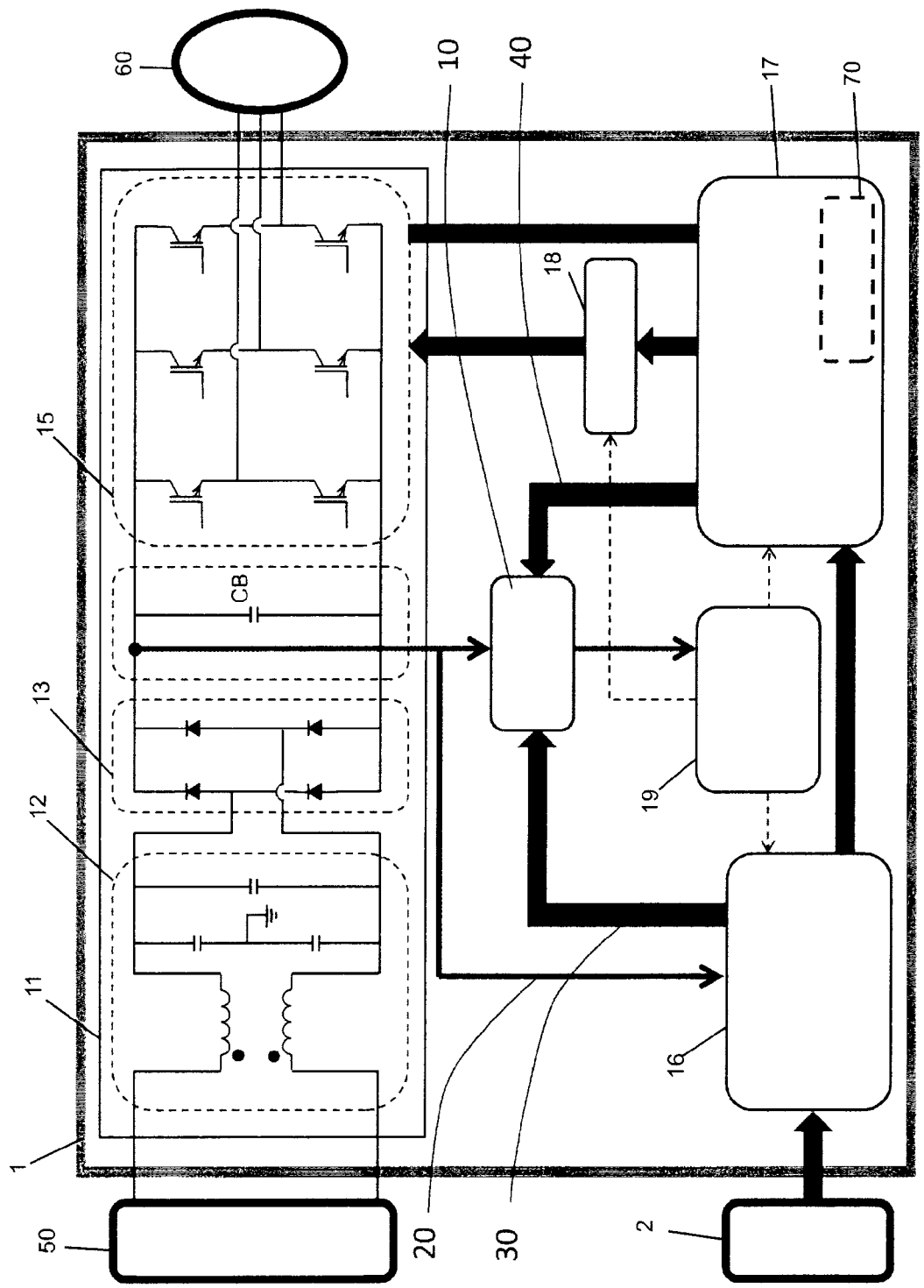
Figure 6:
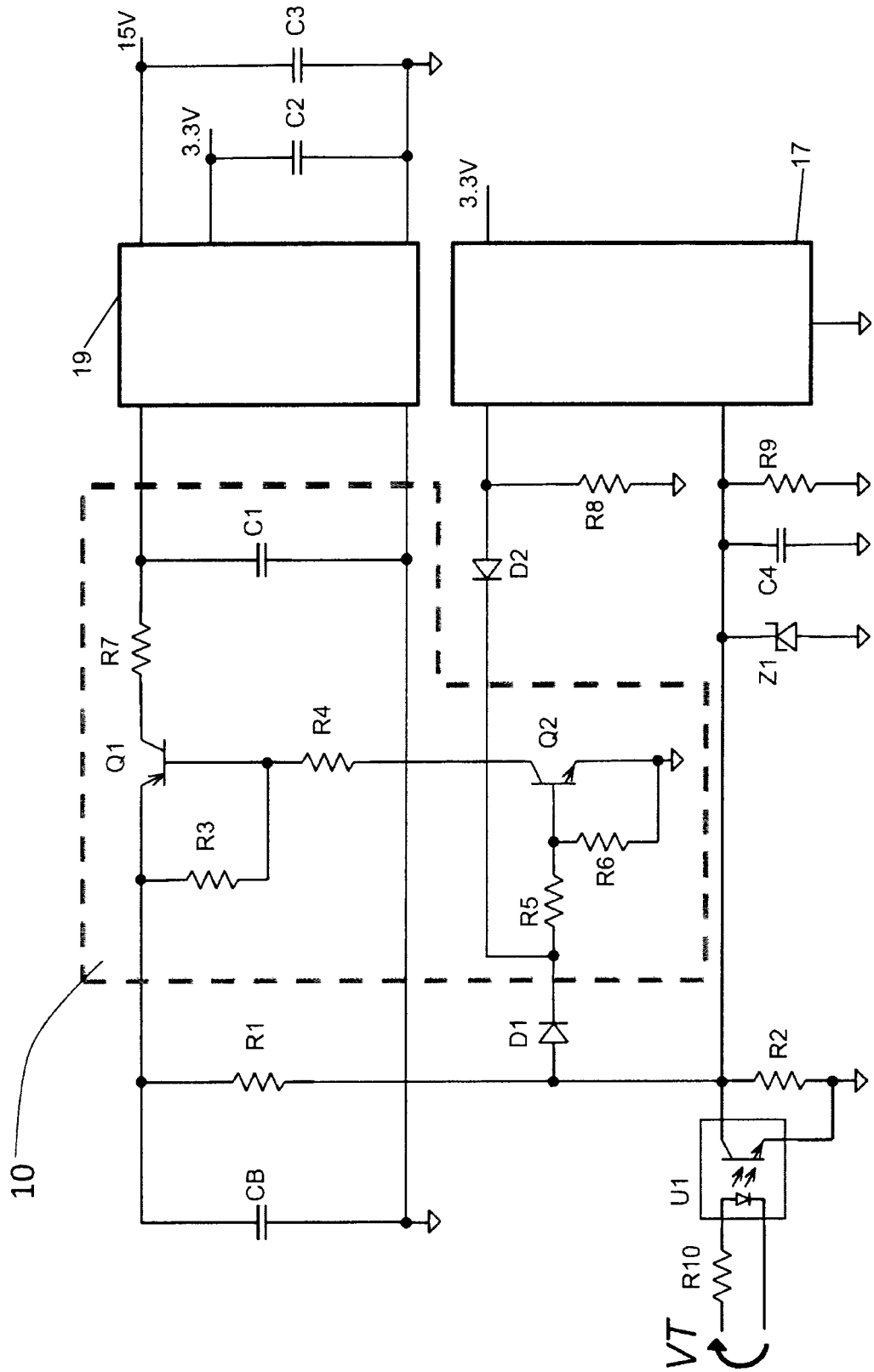
Figure 7:
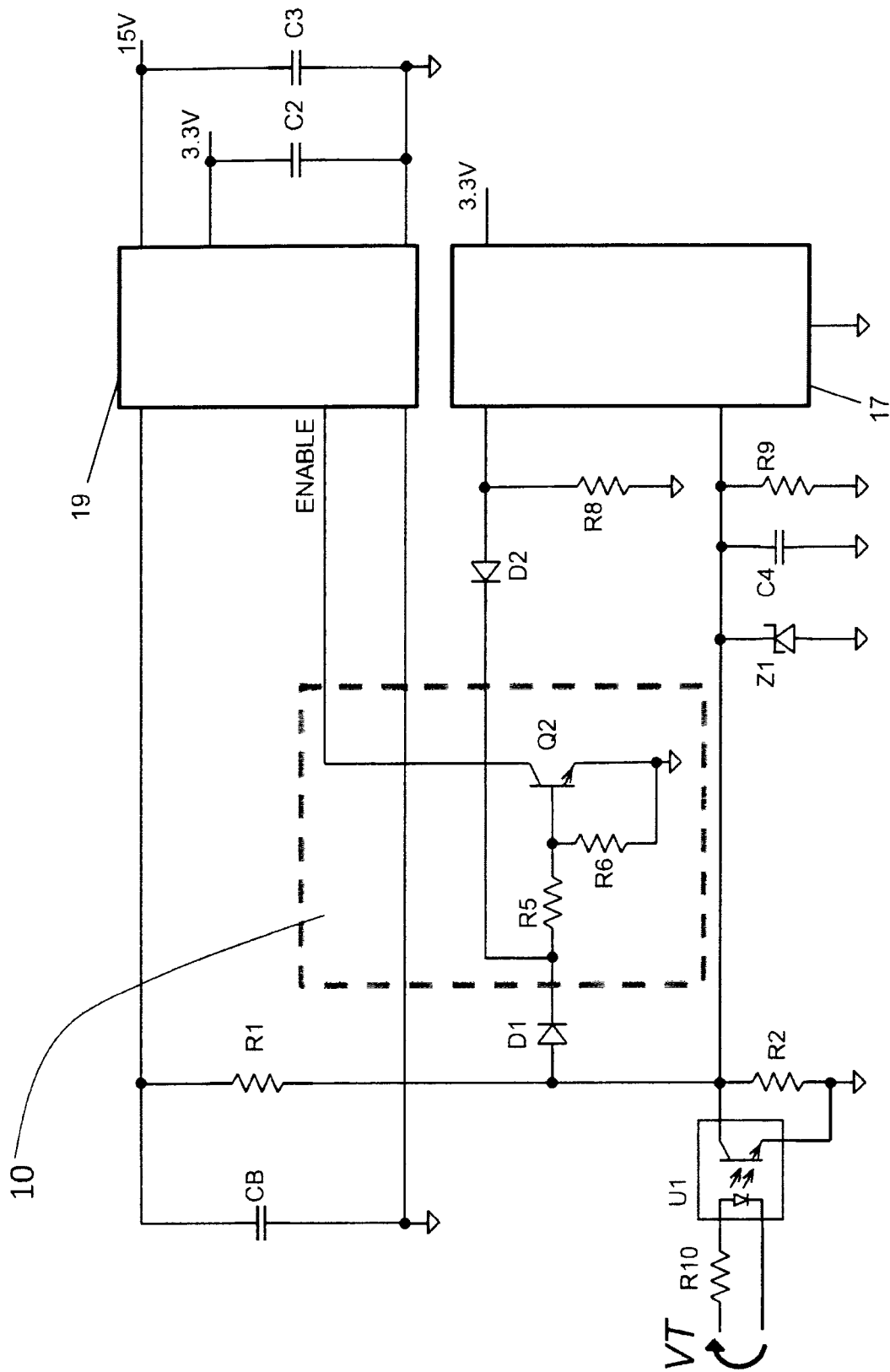
Figure 8:
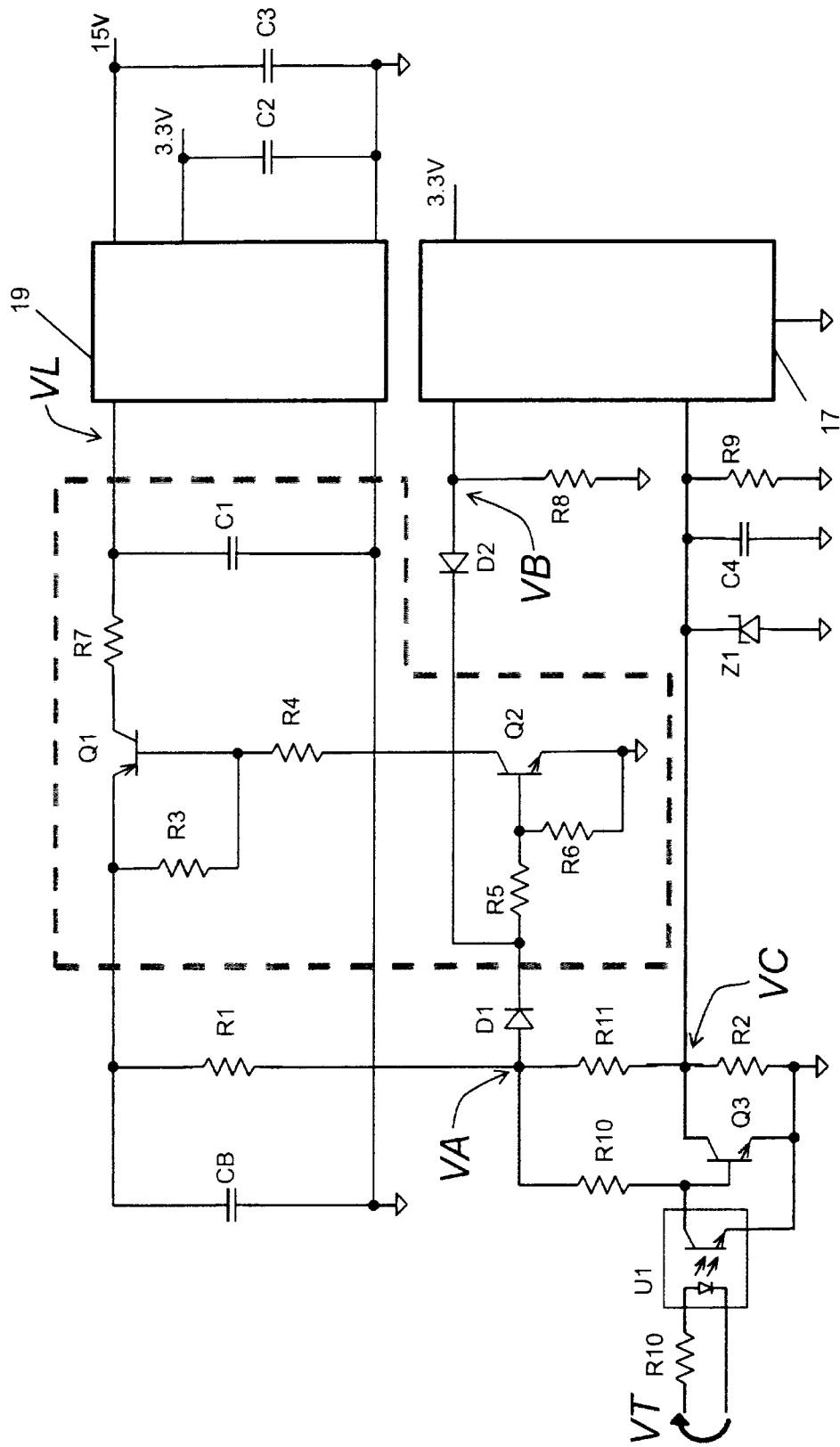
Figure 9:
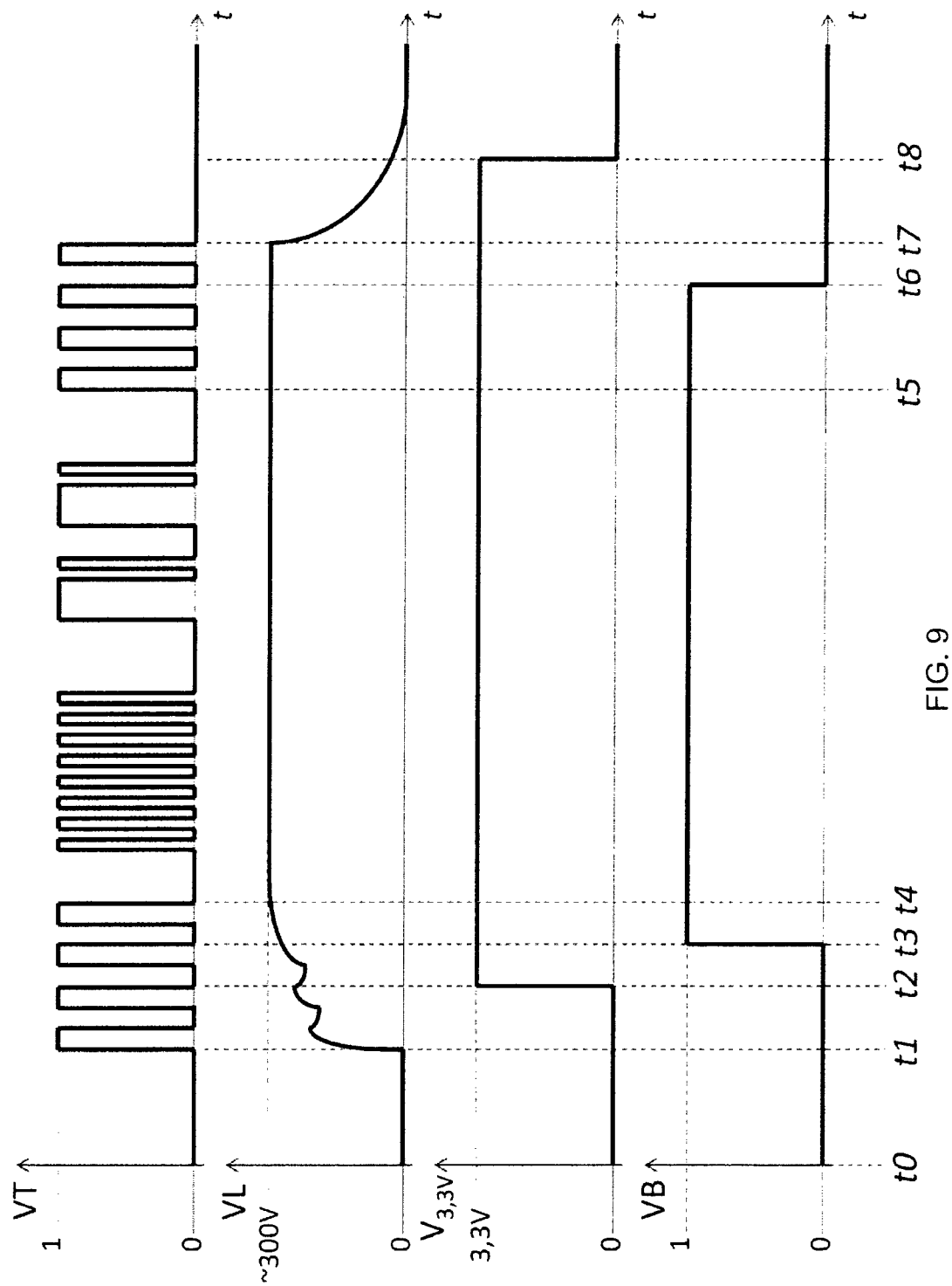
Figure 10:
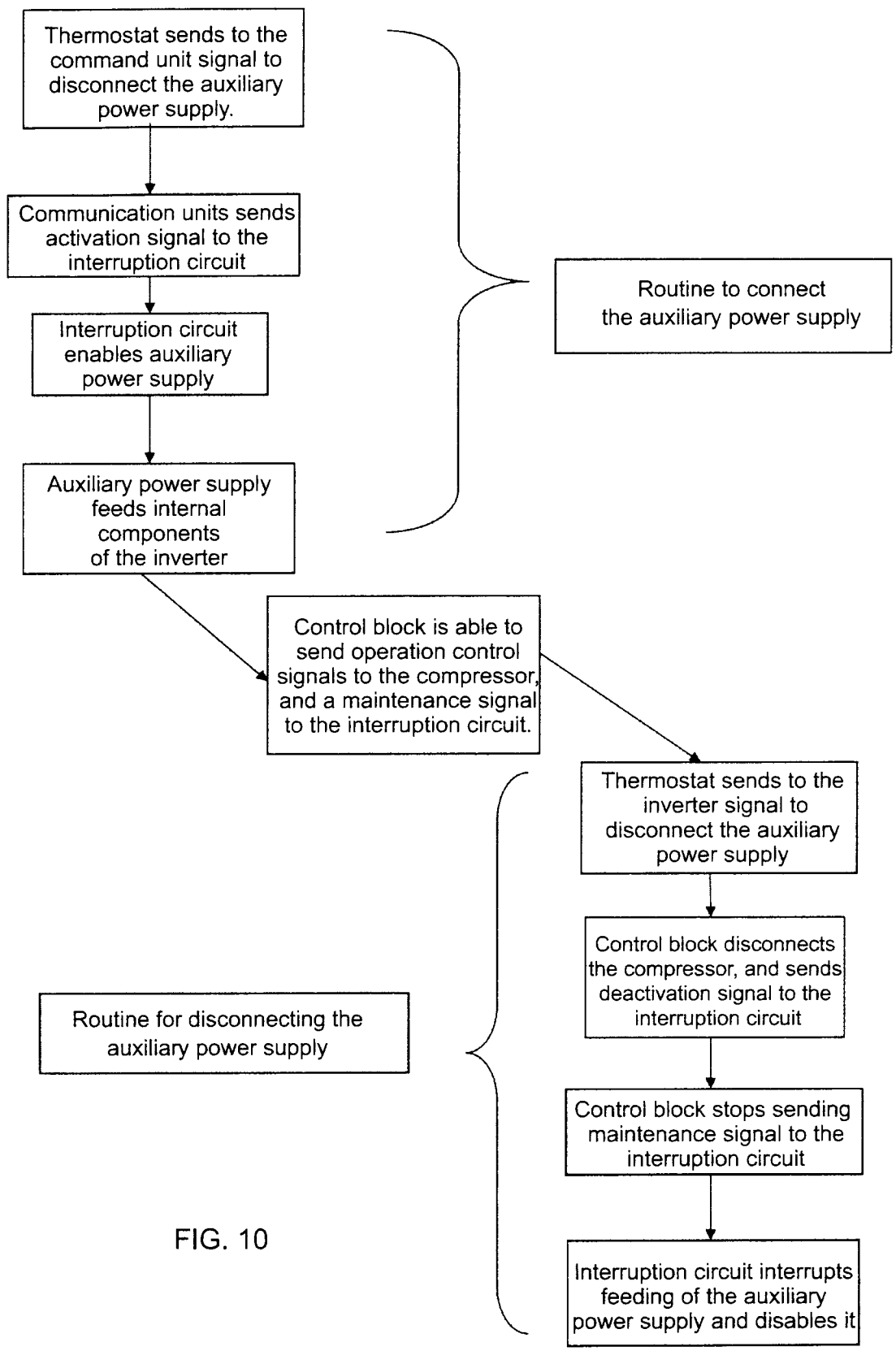

The present invention will now be described in greater detail based on the drawings. The figures show:

FIG. 1—illustrates, by way of block diagrams, the main circuit components of a frequency inverter employed in electronic control systems of the state of the art for variable capacity compressors in cooling systems;

FIGS. 2a, 2b and 2c—illustrate, by way of block diagrams, the connections between the frequency inverter and the electronic or electro-mechanical thermostat used in the electronic control systems of the state of the art;

FIG. 3—is a graph that shows the energy consumption in an operating cycle of the compressor using control systems also from the state of the art, and demonstrating the residual consumption during compressor downtime;

FIG. 4—illustrates an arrangement of a circuit of the state of the art that attempts to eliminate the residual consumption of electric energy of the inverter;

FIG. 5—illustrates a block diagram of the system remote connection and disconnection of the auxiliary power supply of a frequency inverter for variable capacity compressor employed in cooling systems, according to the invention;

FIG. 6—illustrates a first embodiment of circuit arrangement comprised in the system according to the invention;

FIG. 7—illustrates a second embodiment of circuit arrangement comprised in the system according to the invention;

FIG. 8—illustrates a third embodiment of circuit arrangement comprised in the system according to the invention;

FIG. 9—shows the voltage graphs of components of the system according to the invention between the moments of connecting and disconnecting the auxiliary power supply; and FIG. 10—shows a flow chart of a preferred embodiment of the method according to the invention.

DETAILED DESCRIPTION OF THE DRAWINGS

FIG. 5 illustrates the present invention in the form of a block diagram of its components. The system of remote connection and disconnection of auxiliary power supply of frequency inverter is used in inverters for variable capacity compressors 60 used in cooling systems. As can be seen in FIG. 5, the system according to the invention comprises an inverter 3 that has as components a power circuit 11 and internal processing circuits to drive the inverter.

The power circuit 11 serves to adjust the feed voltage of the compressor 60 and the frequency of the feed signal, and is similar to the models used in the systems of the state of the art and described at the beginning of this report. This power circuit has a feed input for alternating current which is connected to a power source 50, normally an alternating current source. In general, this input is connected directly to the power grid that provides an AC voltage. The power circuit also has a voltage output connected to the feed input of the compressor 60, such that the power circuit essentially acts as an AC input voltage converter for variable amplitude and frequency output voltage depending on the conditions in which the compressor has to operate. To perform this function, the power circuit preferably comprises an electromagnetic interference filter 12 connected to the alternating current input, a wave rectifier 13, which may be a bridge rectifier, connected to the filter output, a CB bus capacitor connected in parallel to the output the rectifier, and an inverter bridge 15 (which may be three-phase) with the input connected in parallel to the CB bus capacitor, and with the output connected to the voltage output of the power circuit. When the circuit is in operation, interference and noise from the AC input voltage applied to the circuit are attenuated by the electromagnetic interference filter 12. Thereafter, the AC voltage is rectified by the wave rectifier 13 and energy is accumulated in the CB bus capacitor, forming, at this point, a CC bus in the circuit from which other components of the circuit inverter will be fed. The output of the power circuit 11 is controlled from the inverter bridge 15 which regulates the voltage applied to the compressor.

One of the internal processing circuits of the inverter of the system according to the invention consists of a communication unit 16 of the inverter which performs the communication between the frequency inverter and other elements of the cooling system that control and monitor the running of the compressor motor. The communication unit 16 then receives control signals external to the inverter to connect or disconnect the power supply, and potentially also to connect/disconnect the compressor, and adjusts them for interpreting a control block which is also one of the internal processing circuits that make up the frequency inverter. The communication unit 16 also receives operation control signals of the compressor, relating to frequency and to the signal amplitude which should be applied to the compressor motor, and signals with parameters of the cooling system or of the compressor, but these signals can be sent to the inverter without the need to connect the compressor motor.

The control block is responsible for receiving and interpreting control signals from the compressor sent by the communication unit, and sending to the power circuit a command signal to adjust the feed voltage of the compressor. The control block comprises a control circuit 17 and a command circuit 18. The control circuit 17 (generally a microcontroller or DSP—Digital Signal Processor) receives signals from the communication unit both to connect and disconnect the auxiliary power supply and the compressor, and operation control signals of the compressor. This control circuit internally processes the signals received from the communication unit 16 and sends a control signal to the command circuit 18. The control circuit 17 also receives signals from the power circuit by means of which it monitors electrical magnitudes of the compressor, in order to control its running. The command circuit receives the signal from the control circuit and sends a command signal to the power circuit 11, driving the inverter bridge.

Each of these internal components of the inverter, namely the communication unit 16, the control circuit 17 and the command circuit 18 has an input for feed voltage which receives from an auxiliary power supply of the inverter 19, a feed voltage signal, by means of which these components are powered up to run normally. The auxiliary power supply 19 converts the continuous high voltage, generated on the CC bus of the power circuit, in continuous low amplitude voltage suitable for feeding the components of the inverter. This source 19 is connected and disconnected remotely by the system of remote connection and disconnection of the auxiliary power supply of the inverter, according to the invention, based on the operating status of the compressor, such that when the compressor is in active status, the source 19 is kept connected and the internal components of the compressor are kept running. When the compressor is off, the source 19 is disconnected, also deactivating the components of the inverter, such that they stop consuming energy, whereby increasing the energy efficiency of the system. Even when the compressor does not need to be connected, the auxiliary power supply 19 may also be connected, if it is necessary to send to the inverter only a signal with data and parameters of the cooling system.

In order to carry out this remote connection and disconnect operation, the system according to the invention also comprises a circuit breaker 10, the main function of which is to disconnect the auxiliary power supply whenever the compressor is inactive, or when there is generally no need for the inverter to be connected. Accordingly, the feed voltages of the communication, control and command circuits of the inverter are also disconnected, reducing the stand by energy consumption.

The circuit breaker 10 is connected between the auxiliary power supply 19 and the CC bus of the power circuit 11, enabling or disabling the running of the auxiliary supply 19.

In the embodiment of the invention shown in FIG. 5, the circuit breaker enables or disables the auxiliary supply 19 establishing or interrupting a feed connection of the supply 19 with the CC bus, depending on the need for the components of the inverter to be connected or disconnected. The circuit breaker 10 therefore acts as an active switch. The circuit breaker is commanded both by an external and internal signal of the frequency inverter, and the existence of a drive command internal to the inverter allows the physical means used to provide the external command to be the same as currently used for transmitting reference signals between electronic thermostat of the cooling system and inverter.

The circuit breaker 10 has a first input that receives from the inverter a signal to activate the auxiliary supply 30, indicating whether the auxiliary power supply should be connected or disconnected. This is the aforementioned signal originating outside the inverter, since it depends on an external connect/disconnect command received by the inverter from an external device. A third input of the circuit breaker 10 is connected to a continuous voltage bus of the power circuit. A second input of the circuit breaker 10 receives from the inverter a signal to maintain the auxiliary supply 40 activated, which indicates that the compressor continues to operate. This maintenance signal corresponds to the aforementioned internal drive command of the inverter. An output of the circuit breaker 10 is connected to the feed input of the auxiliary power supply 19.

When the inverter receives an external signal to activate the auxiliary supply 19 indicating that the auxiliary supply should be disconnected, it sends to the first input of the circuit breaker 10 a signal 30 indicating that the auxiliary supply should be connected. In the preferred embodiment of the invention shown in FIG. 5, this signal 30 is sent to the circuit breaker 10 by the communication unit 16, which is what receives the external signal to activate the auxiliary supply.

The circuit breaker 10 then establishes an electrical connection between the feed input of the auxiliary power supply 19 and the continuous voltage bus of the power circuit 11, making the auxiliary power supply 19 be connected, and provides feed voltage to the components of the inverter, namely the communication unit 16, the control circuit 17 and the command circuit 18, making the inverter fully running.

When the inverter receives an external signal, for example from the thermostat, indicating that the auxiliary power supply should be disconnected, the inverter sends, for example by way of the communication unit 16, to the first input of the circuit breaker 10 a signal 30 indicating that the source should be disconnected. When the activation signal 30 of the auxiliary power supply indicates that the source should be disconnected, the control circuit 17 sends to the second input of the circuit breaker 10 a signal 40 indicating that the source should be disconnected. Then, the circuit breaker 10 interrupts the electrical connection between the feed input of the auxiliary power supply 19 and the continuous voltage bus of the power circuit 11, starting the disconnection of the auxiliary power supply 19. After total disconnection of the auxiliary power supply which will be better described subsequently, the communication unit 16, the control circuit 17 and the command circuit 18 stop receiving the feed voltage from the auxiliary power supply 19 and are deactivated, with the exception of the communication unit 16 which continues receiving a second feed signal from the CC bus of the power circuit.

In the period between the signal to connect and disconnect the auxiliary power supply, the circuit breaker 10 should be kept connected, so that all the components of the inverter continue operating normally. During this period, the circuit inverter sends to the second input of the circuit breaker 10 a maintenance signal 40 indicating that the auxiliary supply should be maintained connected, such that the interface of the inverter which receives external control signals can be used to receive operation control signals of the compressor, and does not need to keep receiving the connect/disconnect signal. In the embodiment of the invention shown in FIG. 5, the maintenance signal 40 is sent to the circuit breaker by the control block of the inverter, and particularly by the control circuit 17, which is also responsible for monitoring the running of the compressor. The circuit breaker 10 then keeps the electrical connection between the feed input of the auxiliary power supply 19 and the continuous voltage bus of the power circuit, keeping the inverter operating normally, without the need for the signal of the first input of the circuit breaker to provide information.

In a preferred embodiment of the invention, the external control signals of the inverter both for connecting and disconnecting the auxiliary supply 19 of the inverter, and the operation control signals of the compressor, relating to frequency and to the signal amplitude which should be applied to the motor, are sent to the inverter by a thermostat 21. Preferably, the thermostat has a direct data connection with the communication unit 16 of the inverter. This same connection is used by the thermostat to send the signal to connect and disconnect the auxiliary power supply 19 and also to the operation control signals of the compressor. As already mentioned, even while the compressor and the auxiliary power supply are connected, the communication unit 16 remains active in stand-by status, by means of its additional feed connection 20 which is directly linked to the CC bus of the power circuit. The communication unit should remain active, as it is this unit that will receive the signal from the thermostat indicating that the auxiliary supply should be connected, and will drive the circuit breaker 10, allowing the powering up of the auxiliary power supply 19 and consequently of the control block.

Since the inverter itself internally sends a maintenance signal 40 to the circuit breaker 10, guaranteeing that the auxiliary power supply 19 remains connected, therefore the thermostat 21 need not continually occupy a connection with the communication unit sending a signal indicating that the auxiliary supply is connected. During this continuous operation period in which the auxiliary supply 19 remains connected, the thermostat 21 can use this same connection with the communication unit 16 only to send the operation control signals of the compressor.

FIGS. 6, 7 and 8 illustrate three different forms of embodying on a microelectronic scale the circuit breaker of the system of remotely connecting and disconnecting the auxiliary power supply of the inverter according to the present invention. In the embodiment shown in FIG. 6, the opto-isolator U1 corresponds to the communication unit which receives the connection and disconnection signal from the thermostat, represented by the VT voltage, and potential control signals, and transmits them to the remainder of the inverter circuit. The circuit breaker 10 comprises a pair of transistors NPN Q1 and PNP Q2. These transistors are polarized so as to charge capacitor C1 with CC bus voltage, equivalent to the voltage on the CB bus capacitor, whenever the voltage in the anode of one of diodes D1 or D2 is at a high level. When the capacitor is charged, the auxiliary voltage source is fed and activated.

In this circuit arrangement, the signal to connect the auxiliary supply corresponds to the VT voltage at low level. Thus, whenever the VT voltage coming from the thermostat 21 is at a high level, and the voltage on resistor R8 is at a low level (approximately zero), the circuit breaker 10 will remain blocked, that is, transistors Q1 and Q2 are cut off, interrupting the electrical connection of the CC bus of the power circuit with the auxiliary power supply 19, which then remains disconnected. When the voltage in the thermostat VT is at a low level (zero), the voltage on R2 rises, since there is a voltage plug of the CC bus by way of resistor R1. Diode D1 begins conducting and drives the pair of transistors Q1 and Q2 of the circuit breaker, charging the capacitor C1 and allowing the auxiliary power supply 19 to be fed and connected. Afterwards, it provides feed voltage to the other components of the inverter. Once the control circuit of the frequency inverter is powered up, it emits a signal to maintain the auxiliary supply 40 activated (shown in FIG. 5) at its output connected to resistor R8, keeping the pair of transistors in conduction even if the VT voltage of the thermostat returns to a high level.

In the circuit arrangement shown in FIG. 6, the voltage on resistor R2 corresponds to a voltage plug of the connection between the communication unit represented by the opto-isolator U1 and the control circuit 17. In this connection, resistor R9, capacitor C4 and zener diode Z1 are also connected. Through this connection, the communication unit sends to the control circuit the commands coming from the thermostat relating to the control of the running of the compressor. This is one of the possible forms of embodying the arrangement of the system proposed in FIG. 5. Other forms of interrupting the voltage feed of the CC bus to the auxiliary power supply can be employed, with the use, for example, of MOSFETs.

Another electronic circuit arrangement of the circuit breaker 10 according to the invention is exemplified in FIG. 7. In this case, the circuit breaker 10 essentially comprises a transistor Q2 connected to an enable or disable input of the auxiliary power supply 19. In integrated circuits to drive and switch power control that can be used as auxiliary power supply, it is common to find an input that can be used for this purpose. Thus, when transistor Q2 is polarized and begins conduction, it sends an activation signal to the enable input of the auxiliary power supply 19, connecting the supply and enabling its running. After the supply is enabled, it connects and begins to be powered by the power circuit. Next, the entire inverter begins running in the same manner as that described in relation to FIG. 6, that is, the auxiliary supply 19 provides feed voltage to the other components of the inverter, and the control circuit, once powered up, begins emitting to the circuit breaker 10 the signal to maintain the auxiliary supply 40 activated (shown in FIG. 5) at its output connected to resistor R8, keeping the circuit breaker activated. Also in this embodiment of the invention, while the circuit breaker remains connected by the signal to maintain the auxiliary supply activated, the interface of the thermostat with the inverter is used for sending control signals of the running of the compressor. When the signal to activate the auxiliary supply indicates that the auxiliary supply should be disconnected, and the inverter stops sending the signal to maintain the auxiliary supply 40 activated to the auxiliary power supply, the circuit breaker interrupts the sending of the activation signal to the enable input of the auxiliary power supply, deactivating it, and disabling the running of the inverter.

FIG. 8 illustrates another electronic circuit arrangement of the circuit breaker 10 according to the invention. In this case, the circuit is arranged so that the auxiliary power supply is connected when the VT signal coming from the thermostat is at a high level. Accordingly, transistor Q3 is added to the output of circuit U1, in parallel with resistor R2. Resistors R10 and R11 are also added, being respectively connected in parallel with the base and the collector of transistor Q3. When the VT voltage is at a high level, transistor Q3 is cut off, making the VC node rise to a high level. Resistor R11 should be much smaller than R2, and thus the voltage in the VA node will also be at a high level. In other words, the VA and VC nodes are in synchronicity with the VT signal coming from the thermostat, as their voltages vary in conjunction with the voltage variations of the VT signal. Then, transistors Q1 and Q2 are polarized and begin conducting, making the voltage at point VL rise to a sufficiently high level to drive the auxiliary power supply which will power up the other components of the inverter. Once the components are powered up, they run as usual, and the inverter receives the command signal from the thermostat, which is interpreted by the control circuit, which drives the inverter bridge and monitors the electrical magnitudes of the compressor, in order to control it. The signal to maintain the auxiliary supply 40 activated (shown in FIG. 5) sent by the control circuit to the circuit breaker 10 is represented by the voltage in VB which also rises to a high level when the control circuit is activated and begins sending this signal to the circuit breaker.

Still within the concept of the present invention, other forms of interrupting the running of the auxiliary power supply 19 could be used, deactivating it or interrupting the voltage feed from the CC bus to the auxiliary power supply, for example with the use of transistors of the MOSFETs kind.

The electronic control system according to the present invention can also be applied to circuits of the kind shown in FIGS. 2b and 2c of the state of the art, in which the inverter only receives a command external signal from the thermostat to connect and disconnect the auxiliary power supply and the compressor, and not always receives control signals of the running of the compressor. In these cases, it is the control circuit of the inverter that defines the point of operation of the compressor, oftentimes based on past operating records. Therefore, when implementing the invention and carrying out the disconnection of the auxiliary power supply, the electronic control system should also be provided with a non-volatile memory 70 to keep the past operating records of the compressor. This memory does not represent additional cost for implementing the invention, because in some current forms of the state of the art to reduce the stand-by consumption of the kind shown in FIG. 4, these memories are already used.

In contrast, in embodiments of the invention in which the inverter receives command signals from the compressor external to the inverter, for example from the thermostat, a non-volatile memory is not necessary, as the thermostat will always be activated and connected to the power grid.

The flowchart shown in FIG. 10 shows the steps of the electronic control method of a variable capacity compressor according to a preferred embodiment of the invention. This method can be better understood in conjunction with the graphs of FIG. 9 which show the behavior of the voltage signals of some components of the system according to the invention between the moments of connecting and disconnecting the auxiliary power supply, using the circuit arrangement of the kind shown in FIG. 8. It can be noted that the VT, VL, $V_{3.3V}$ and VB voltages shown in FIG. 9 correspond to points or nodes inside the circuit of FIG. 8 identified with these same letters.

The method initially comprises a step of sending to the circuit inverter a command signal for connecting the auxiliary supply and the compressor. In the preferred embodiments of the invention, this signal is sent to the inverter by the thermostat, and the internal processing circuit of the inverter that receives the signal is the communication unit. In FIG. 9, the signal of the thermostat for connecting and disconnecting the auxiliary supply and the compressor is represented by the VT voltage. The voltage VL represents the voltage input of the auxiliary power supply. In the initial condition in which the compressor is disconnected, between instants t0 and t1, the thermostat sends a low signal to the input of the inverter and the voltage input of the auxiliary power supply VL is also at a low level, keeping the auxiliary power supply disconnected. The feed voltage of the control circuit represented by $V_{3.3V}$ in FIG. 9 and the output voltage VB of the control circuit are also at a low level. The thermostat maintains the VT voltage at a low level during the time in which the auxiliary supply should remain disconnected. In t1, the thermostat sends a voltage signal that has high enough levels to polarize the opto-isolator U1. This signal can be a sequence of pulses, as illustrated in FIG. 9, or a continuous high level voltage.

In the following step of the method, after receiving the command signal to connect the auxiliary supply 19, an internal processing circuit of the circuit inverter, more particularly the communication unit, sends to the circuit breaker 10 an activation signal indicating that the auxiliary power supply should be connected. This step occurs between moments t1 and t2, when the voltages in nodes VA and VC shown in FIG. 8 rise to a high level, and the voltage VA polarizes diode D1, which polarizes the pair of transistors Q1 and Q2 of the circuit breaker, so that they begin conduction.

Thereafter, the circuit breaker 10 enables the running of the auxiliary power supply establishing contact between the power circuit and the auxiliary power supply. This step occurs when the pair of transistors Q1 and Q2 of the circuit begins conducting, consequently making voltage VL in the input of the auxiliary power supply rise to a high enough level for the auxiliary power supply to begin operating. In an alternative embodiment of the method of the invention, using a circuit of the kind shown in FIG. 7, the step of enabling the running of the auxiliary power supply occurs with the activation by the circuit breaker 10 of the enable signal (ENABLE input) of the integrated circuit that constitutes the auxiliary supply.

At moment t2 in which the auxiliary power supply begins working, it provides an internal feed voltage to the components of the circuit inverter. As can be seen in FIGS. 8 and 9, at moment t2, the output voltage of the auxiliary power supply represented as $V_{3.3V}$ rises to the high value of 3.3V and begins feeding the control circuit, activating the start of its operation, which occurs at t3. From that point onwards, the control circuit begins sending a signal to maintain the auxiliary supply to the circuit breaker activated, during the period in which the auxiliary supply should remain connected. This step occurs at moment t3, in which the control circuit drives the voltage VB at its output, which rises to a high level, providing a second polarization path for the pair of transistors Q1 and Q2 of the circuit breaker. When the control circuit enters into operation, it also begins interpreting control signals of the compressor coming from the thermostat and sent thereto by the communication unit. Additionally, the control circuit begins sending command signals to the power circuit, such that it controls the operation of the compressor, for example, adjusting the feed voltage of the compressor. When in operation, the control block also performs steps of receiving electrical magnitudes from the compressor and monitoring its running.

Thus, from instant t3 onwards, the circuit breaker is kept polarized and driven by the signal to maintain the auxiliary supply activated by means of voltage in the VB node, and then the thermostat can stop sending the signal that serves to connect the auxiliary power supply, which occurs at t4 in the graph of FIG. 9, in which the VT signal falls to a low level. Between t4 and t5, the compressor operates normally, in which period the thermostat may send any signal to the frequency inverter with other objectives, such as speed reference, data exchange, among others, that constitute the operation control signals of the compressor. The signals sent by the thermostat between instants t4 and t5 previously pass through communication unit 16 which adjusts them for interpretation by the control circuit, and then sends them to said control circuit, where they are read by the input of the circuit connected to resistor R9. In situations in which the compressor does not need to be placed into operation, the interface between the thermostat and the communication circuit is nevertheless used for data exchange, while the activation maintenance signal keeps the auxiliary supply connected, feeding the components of the inverter.

From instant t5 onwards, there begins a sequence of steps for disconnecting the auxiliary power supply of the method according to the invention. At instant t5, the circuit inverter receives a command signal to disconnect the auxiliary supply, which is sent by the thermostat and shown in FIG. 9 as the sequence of VT pulses between instants t5 and t7. This signal to disconnect the auxiliary supply is also sent by the communication unit of the inverter to the circuit breaker 10.

The control circuit of the inverter begins the procedure of disconnecting the compressor, if it is operating, and next, at t6, interrupting the sending of the signal to maintain the auxiliary supply to the circuit breaker activated. In the embodiment shown in FIG. 8, the control circuit performs this step modifying the voltage VB to a low level (zero), as also indicated in the graph of FIG. 9. Consequently, the circuit breaker 10 disables the running of the auxiliary power supply, either interrupting its powering-up (pursuant to embodiment in FIGS. 6 and 8), or disabling it by interrupting the sending of the enable signal (pursuant to embodiment in FIG. 7). In the embodiment in FIGS. 6 and 8, this occurs, as the pair of transistors Q1 and Q2 of the circuit breaker 10 is cut off at instant t7, interrupting the connection of the feed input of the supply of auxiliary voltage with the voltage on the CB bus capacitor of the power circuit. Then the voltage VL on capacitor C1 decreases and the auxiliary power supply disconnects at t8. Accordingly, the voltage $V_{3.3V}$ at the output of the auxiliary power supply also falls to a low level, disconnecting the control circuit.

From that point onwards, the system is in the same status as in t0, being prepared for a new connection sequence. The events that occur at instants t6 and t7 may also be inverted, that is, the control circuit of the inverter may disable the circuit breaker by the signal to maintain the auxiliary supply of the VB output activated, after termination of the command to disconnect the auxiliary supply coming from the thermostat.

In other words, generally speaking, the circuit breaker 10 interrupts the connection between the auxiliary power supply and the power circuit, or disables the auxiliary supply whenever the activation signal sent by the communication unit and the signal to maintain the auxiliary supply activated sent by the control block indicate that the auxiliary supply should be disconnected. Alternatively, pursuant to FIG. 7, the circuit breaker 10 enables or disables the auxiliary power supply by way of an enable input of the auxiliary power supply.

Lastly, based on the characteristics described herein, it can be noted that the system and method of the present invention allow the auxiliary power supply of the frequency inverter to be disconnected by employing low capacity components to conduct the electric current, reducing implementation costs.

The system and the method of the present invention also allow the auxiliary power supply of the frequency inverter to be disconnected and reconnected by way of the same physical means currently employed to transmit the reference signal between electronic thermostat and frequency inverter. The disconnection and reconnection of the auxiliary power supply of the frequency inverter can be carried out without the need for altering the hardware of the current solutions for thermostats.

Having described an example of a preferred embodiment, it should be understood that the scope of the present invention encompasses other possible variations, being limited only by the content of the accompanying claims, potential equivalents being included therein.

The invention claimed is:

1. An electronic control system of a variable capacity compressor (60), comprising an inverter (3) that receives external control signals, and generates signals to drive the compressor, wherein the inverter comprises:
   a power circuit (11) for adjusting the feed voltage of the compressor, with a feed input for alternating current, a continuous voltage bus and a variable amplitude and frequency voltage output to feed the compressor,
   at least one internal processing circuit, and
   an auxiliary power supply (19) that provides internal feed voltages to the inverter and activates the inverter, wherein:
   the inverter also comprises a circuit breaker (10) with a first input that receives from an internal processing circuit of the inverter an external signal to activate the auxiliary power supply (30), a second input that receives from an internal processing circuit of the inverter a signal to maintain the auxiliary supply activated (40) and an output connected to an input of the auxiliary power supply,
   when the external signal to activate the auxiliary supply (30) indicates that the auxiliary supply should be connected, the circuit breaker (10) enables the running of the auxiliary power supply (19), which activates the running of the inverter, and the internal processing circuit of the inverter begins sending, continually, the internal maintenance signal to activate the auxiliary supply (40) to the circuit breaker (10) indicating that the auxiliary supply should be kept connected, and making the circuit breaker keep the auxiliary power supply (19) enabled, when the external signal to activate the auxiliary supply (30) indicates that the auxiliary supply should be disconnected, and the internal processing circuit of the inverter stops sending the signal to maintain the auxiliary supply activated (40) to the circuit breaker (10), the circuit breaker (10) disables the auxiliary power supply (19), deactivating the running of the inverter.

2. An electronic control system according to claim 1, wherein the internal processing circuit of the inverter sends to the circuit breaker (10) an external signal to activate the auxiliary power supply (30) in response to an external command signal received by the inverter which indicates whether the auxiliary power supply (19) should be connected or disconnected.

3. An electronic control system according to claim 1, wherein the external command signal received by the inverter also contains commands for connecting and disconnecting the compressor.

4. An electronic control system according to claim 1, wherein the input of the auxiliary power supply (19) connected to the output of the circuit breaker (10) is an enable input, and the auxiliary power supply (19) also has a feed input connected to the continuous voltage bus of the power circuit, and when the signal to activate the auxiliary supply (30) indicates that the auxiliary supply should be connected, the circuit breaker (10) sends an activation signal to the enable input of the auxiliary power supply (19) which enables the auxiliary power supply (19).

5. An electronic control system according to claim 1, wherein the input of the auxiliary power supply (19) connected to the output of the circuit breaker (10) is a feed input, the circuit breaker (10) also comprises a third input connected to the continuous voltage bus of the power circuit, and when the signal to activate the auxiliary supply (30) indicates that the auxiliary supply should be connected, the circuit breaker establishes an electrical connection between a feed input of the auxiliary power supply (19) and the continuous voltage bus of the power circuit, feeding and enabling the auxiliary power supply (19), the electrical connection between the auxiliary power supply (19) and the continuous voltage bus is maintained while the circuit breaker (10) receives the signal to maintain the auxiliary supply activated (40).

6. An electronic control system according to claim 1, wherein the inverter also comprises as internal processing circuits a communication unit (16) and a control block, and wherein:

the communication unit (6) comprises an input that receives the external control signals for connecting or disconnecting the auxiliary supply, an output connected to the control block for sending the operation control signals of the compressor, an output connected to the first input of the circuit breaker (10), for sending the signal to activate the auxiliary supply (30), and an additional feed connection (20) with the power circuit that feeds and keeps the communication unit (16) activated, when the auxiliary power supply (19) is disconnected, and the control block comprises an input for receiving the control signals of the compressor sent by the communication unit, and interpreting them, an output for sending to the power circuit a command signal for adjusting the feed voltage of the compressor, and an output for sending to the circuit breaker the signal to maintain the auxiliary supply activated (40), during the period in which the auxiliary supply should remain connected.

7. An electronic control system according to claim 6, wherein the input of the communication unit (16) which receives the external control signals for connecting or disconnecting the auxiliary supply is connected to a thermostat (21) that sends these control signals for connecting and disconnecting the auxiliary power supply (19).

8. An electronic control system according to claim 7, wherein the thermostat (21) also sends the communication unit (16) operation control signals of the compressor by way of the same physical means of connection used for sending the control signals for connecting and disconnecting the auxiliary power supply, and the communication unit (16) sends to the control block the operation control signals of the compressor suitable for interpretation, and when the control block sends to the circuit breaker (10) the maintenance signal indicating that the auxiliary supply should be kept activated the thermostat (21) sends to the communication unit (16) only operation control signals of the compressor.

9. An electronic control system according to claim 7, wherein the control block comprises a non-volatile memory (70) which stores the past operating records of the compressor, when the thermostat (21) sends to the communication unit (16) only external control signals for connecting or disconnecting the auxiliary supply, and the control block controls the operation of the compressor.

10. An electronic control system according to claim 6, wherein the control block comprises a control circuit (17) and a command circuit (18), wherein the control circuit (17) receives the signals from the communication unit (16), sends the maintenance signal (40) to the circuit breaker (10), sends a control signal to the command circuit (18), receives electrical magnitudes from the compressor and monitors its running, and the command circuit (18) sends a command signal to the power circuit, the control circuit and the command circuit also each receive a feed voltage signal from the auxiliary power supply.

11. An electronic control system according to claim 1, wherein the power circuit comprises a continuous voltage bus to which the circuit breaker (10) is connected.

12. An electronic control method of a variable capacity compressor, by means of a system that comprises an inverter that controls the operation of the compressor, the inverter having a power circuit for adjusting the feed voltage of the compressor, an auxiliary power supply (19) powered by the power circuit, which provides feed voltages internal to the inverter and activates its running, a circuit breaker (10) to activate the auxiliary power supply (19), and at least one internal processing circuit, the method comprising:

sending to the inverter an external command signal to connect the auxiliary supply;

sending the circuit breaker (10) an external signal from an internal processing circuit of the inverter in response to the external command signal to activate the auxiliary supply (30) indicating that the auxiliary supply should be connected, using the circuit breaker (10) to enable running of the auxiliary power supply (19), providing internal feed voltages from the auxiliary power supply (19) to the inverter to activate the inverter, sending from the inverter to the circuit breaker a signal to maintain the auxiliary supply activated (40) during the period in which the auxiliary supply should remain connected, sending to the inverter an external command signal to disconnect the auxiliary supply when the auxiliary supply has to be disconnected;

sending the circuit breaker (10) a deactivation signal from the internal processing circuit of the inverter indicating that the auxiliary supply should be disconnected, and stop sending from the inverter to the circuit breaker (10) the signal to maintain the auxiliary supply activated (40), using the circuit breaker (10) to disable the running of the auxiliary power supply (19) to deactivate the running of the inverter.

13. An electronic control method according to claim 12, wherein the external command signal received by the inverter also contains a command to connect or disconnect the compressor, and when the inverter is activated, it also begins sending control signals to the compressor to control its operation.

14. An electronic control method according to claim 12, wherein the auxiliary power supply (19) has an enable input connected to the output of the circuit breaker (10), and a feed input connected to the continuous voltage bus of the power circuit, and in the step in which the circuit breaker (10) enables the running of the auxiliary power supply (19), the circuit breaker (10) sends an activation signal to an enable input of the auxiliary power supply (19) which enables the auxiliary power supply (19).

15. An electronic control method according to claim 12, wherein the auxiliary power supply (19) has a feed input connected to the output of the circuit breaker (10), and the circuit breaker (10) comprises an input connected to the continuous voltage bus of the power circuit, and in the step in which the circuit breaker (10) enables the running of the auxiliary power supply (19), the circuit breaker establishes an electrical connection between the feed input of the auxiliary power supply (19) and the continuous voltage bus of the power circuit, feeding and activating the auxiliary power supply (19), and electrical connection between the auxiliary power supply (19) and the continuous voltage bus is kept while the circuit breaker (10) receives the signal to maintain the auxiliary supply activated (40).

16. An electronic control method according to claim 12, wherein a thermostat (21) outside the inverter sends the inverter the command signal to connect and disconnect the inverter.

17. An electronic control method according to claim 16, wherein the thermostat (21) also sends the circuit inverter operation control signals of the compressor.

18. An electronic control method according to claim 17, wherein the circuit inverter comprises as internal processing circuits a communication unit (16) and a control block, wherein:

a communication unit performs the steps of receiving the external command signal to connect or disconnect the auxiliary supply, adjusting these signals for interpretation by the control block, and sending to the circuit breaker (10) the signal to activate the auxiliary supply (30) indicating that the auxiliary supply should be connected, and the control block performs the steps of receiving and interpreting the control signals of the compressor sent by the communication unit, sending to the power circuit a command signal to adjust the feed voltage of the compressor, sending to the circuit breaker (10) the signal to maintain the auxiliary supply activated (40) during the period in which the auxiliary supply should remain connected, receive electrical magnitudes from the compressor and monitor its running.

19. An electronic control method according to claim 18, wherein while the control block sends the circuit breaker (10) the signal to maintain the auxiliary supply activated (40), the thermostat sends to the communication unit only operation control signals of the compressor.

20. An electronic control method according to claim 16, wherein the thermostat (21) sends the communication unit (16) only external control signals to connect or disconnect the auxiliary supply, and the method also comprises a step of storing the past operating records of the compressor in a non-volatile memory.

\* \* \* \* \*